(12) United States Patent
Asbury (10) Patent No.: US 8,673,039 B2
(45) Date of Patent: Mar. 18, 2014

(54) ENHANCED VANE BUNDLE DESIGN (71) Applicant: William S. Asbury, Dallas, TX (US)

(72) Inventor: William S. Asbury, Dallas, TX (US)

(73) Assignee: Peerless Mfg, Co., Dallas, TX (US)

(*) Notice: Subject to any disclaimer, the term of this patent is extended or adjusted under 35 U.S.C. 154(b) by 0 days.

(21) Appl. No.: 13/952,358

(22) Filed: Jul. 26, 2013

(65) Prior Publication Data

US 2013/0312377 A1  Nov. 28, 2013

Related U.S. Application Data (62) Division of application No. 13/172,266, filed on Jun. 29, 2011, now Pat. No. 8,500,837.

(51) Int. Cl.
*B01D 45/00* (2006.01)

(52) U.S. Cl.
USPC ........... 55/445; 55/440; 55/441; 55/442; 55/443; 55/444; 55/446; 55/462; 55/463; 55/464; 55/465; 55/DIG. 17

(58) Field of Classification Search
USPC ........... 55/440–446, 462–465, DIG. 17
See application file for complete search history.

(56) References Cited

U.S. PATENT DOCUMENTS

| | | | |
|---|---|---|---|
| 1,926,262 A * | 9/1933 | Campbell | 55/324 |
| 2,276,277 A | 3/1942 | Waters | |
| 3,405,511 A | 10/1968 | Halter et al. | |
| 4,971,613 A | 11/1990 | Valliant | |
| 6,770,121 B1 | 8/2004 | Sindel | |
| 7,488,361 B2 | 2/2009 | Larnholm | |

* cited by examiner

*Primary Examiner* — Dung H Bui
(74) *Attorney, Agent, or Firm* — Andrews Kurth LLP; Sean S. Wooden; Matthew J. Esserman (57) ABSTRACT

An enhanced vane bundle design that provides additional inlet chord area. An enhanced vane bundle for use in separator vessels includes top and bottom convexly-curved outlet baffles that extend horizontally from the outlet-side of the vane pack, the outlet baffles including a plurality of corresponding holes. The enhanced vane bundle further includes curved plates affixed to the convexly-curved outlet baffles, the curved plates and the convexly-curved outlet baffles define vertical pockets that extend vertically through an entirety of an outlet chord area on an outlet side of the enhanced vane bundle. The enhanced vane bundle further includes a plurality of tubes connecting the corresponding holes of the outlet baffles and extending vertically through the entirety of the outlet chord area.

12 Claims, 6 Drawing Sheets

ENHANCED VANE BUNDLE DESIGN

This application is a divisional application of U.S. patent application Ser. No. 13/172,266, filed Jun. 29, 2011, which is hereby incorporated herein by reference in its entirety.

TECHNICAL FIELD

The technical field is impingement vanes used for liquid-gas phase separation.

BACKGROUND

Liquid and gas mixtures have to be phase separated in order to remove liquid droplets from industrial gas streams to satisfy environmental standards (e.g., radioactive water from steam at nuclear power plants) or to purify gas streams, increase liquid recovery, and to protect rotating equipment located downstream (e.g., oil processing facilities, engine air intakes, gas processing plants). A complete phase separation will eventually occur without employing any mechanical devices given the effects of gravity and long contact times; however, to accelerate this process several separation techniques have been proposed. These techniques operate based on one or more physical forces accelerating fluid separation, such as inertial, gravitational, diffussional, centrifugal and electrostatic. Mechanical equipment operating on these principles include impingement separators (baffle, wire mesh, vanes), cyclones, knock-out pots, and filters, as described in U.S. Pat. No. 6,017,377, and wet precipitators, as described in U.S. Pat. No. 5,843,210.

The above separation techniques are selected based on the liquid collection efficiency requirement, gas flow rate and liquid loading, solid deposition tolerance, pressure drop, and capital cost. There is a need to develop liquid/gas separators that will achieve high level of liquid removal efficiency and throughput and at the same time minimize the amount of energy that is required to treat the gas (pressure drop) and minimize capital cost.

One of the most widely used gas/liquid separators are impingement separators. The basic elements of impingement separators are strategically located devices (targets) on which liquid droplets collide. The simplest impingement separators consist of a baffle or disk inserted against the vessel inlet. These separators provide low droplet removal efficiency but can remove bulk of the liquid entering the vessel. To improve efficiency and recovery of smaller droplets more sophisticated impingement separators have been developed. One type of these devices is vane-type separator that consists of parallel plates (see, e.g., U.S. Pat. Nos. 4,581,051 and 4,557,740) that are straight or bent creating flow channels. Typically, the channels are of uniform cross section across their entire length (see, e.g., U.S. Pat. No. 5,972,062). In these devices, liquid droplets present in the gas stream impinge on the plates due to inertia of the droplets and collect on the vane surfaces in the form of a film of liquid. This liquid film (recovered liquid) drains down the vane into the collection devices without re-entrainment. The channels also can be arranged radially using serpentine vanes (see, e.g., U.S. Pat. No. 5,112,375).

Figure 1:
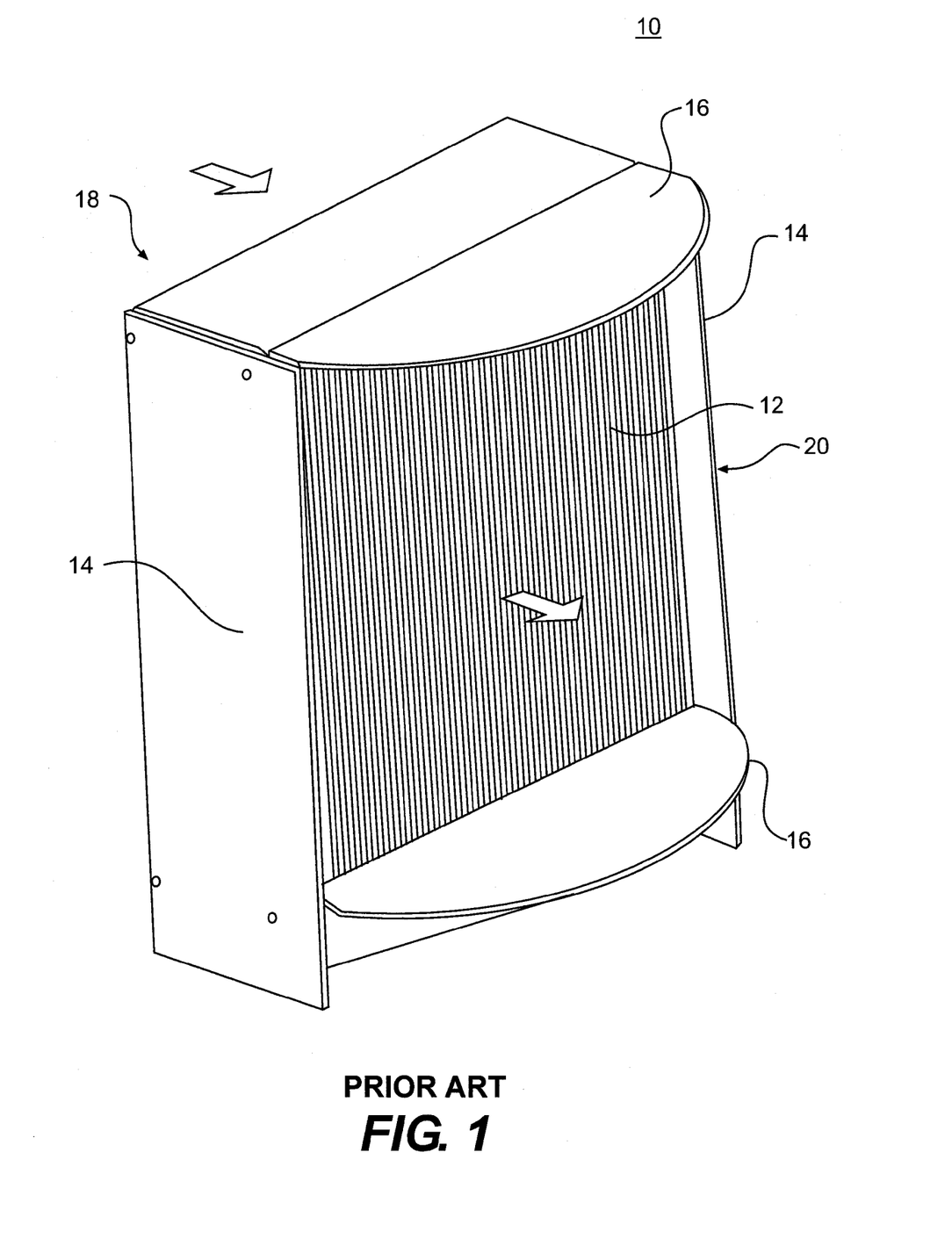
FIG. 1 is a perspective side view a prior art chevron impingement vane pack.

With reference now to FIG. 1, shown is a chevron-style impingement vane bundle or pack 10. As shown, chevron-style impingement vane bundles 10 include vanes 12 affixed to (e.g., welded) inside boxing 14. Two concavely-curved, horizontal plates or outlet baffles 16 are affixed to (e.g., welded) to the boxing 14, channeling the flow of gas so that the gas only flows through the vanes 12 from the inlet-side 18 of the vane bundle 10 towards the outlet-side 20 of the vane bundle 10 and to the outlet nozzle of the separator vessel (not shown). The boxing 14 and the outlet baffles 16 may be welded or otherwise affixed to the separator vessel walls to secure the vane bundle 10 to the separator vessel. The outlet baffles 16 are curved to fit the separator vessel walls and block the vertical flow of gas on the outlet-side 20 of the vane bundle 10. The area formed on the outlet-side of the vane bundle 10, between the vanes 12, outlet baffles 16 and the interior wall of the separator vessel may be referred to as the outlet chord area.

Chevron-style impingement vanes bundles 10 are widely used for the separation of liquid phase droplets from industrial gas streams. Often such vane bundles 10 are employed in vertical vessels in which the gas stream is directed to the vane bundle 10 from either below of from above the vane bundle 10. Several factors limit the amount of gas that can be fed to a given vane bundle 10 without encountering localized flooding in the vane pack 10 and liquid carryover from the separator.

One of these factors is the inlet chord area available between the vane boxing 14 edge on inlet-side 18 of the vane pack 10 and the interior wall of the vessel (not shown). If velocities in this chord area exceed certain values, the gas stream will not disperse itself evenly across the vane bundle 10 and flooding and carryover will occur. To increase the available chord area, vane packs 10 have been placed off center of the vessel centerline, towards the outlet nozzle of the separator vessel. This is done as the inlet chord area is more important to separator performance than is the outlet chord area.

There is a need to increase the inlet chord area even further to increase the amount of gas that can be fed to a given vane bundle without encountering localized flooding in the vane pack and liquid carryover from the separator.

SUMMARY

Embodiments overcome the disadvantages of the prior art and provide an increased inlet chord area so that an increased amount of gas can be fed to the given vane bundle without encountering localized flooding in the vane pack. These advantages and others are provided by a separator device for separating solids or liquids from gas that includes a vertical vessel, including a wall that defines an interior of the vessel. The vessel includes an inlet, an outlet, and a vane pack connected to the outlet and defining an outlet chord area between an outlet-side of the vane pack and the outlet in the interior of the vessel. A first inlet chord area is defined from the inlet to an inlet-side of the vane pack by the wall of the vessel. The vane pack also defines a plurality of vertical pockets that extend vertically through the entirety of the outlet chord area and provide second inlet chord area and gas flows from the inlet to the inlet-side of the vane pack through the first and second inlet chord area.

These advantages and others are provided by a separator device for separating solids or liquids from gas that includes a vertical vessel, including a wall that defines an interior of the vessel. The vessel includes an inlet, an outlet, and a vane pack connected to the outlet and defining an outlet chord area between an outlet-side of the vane pack and the outlet in the interior of the vessel. A first inlet chord area is defined from the inlet to an inlet-side of the vane pack by the wall of the vessel. The vane pack includes top and bottom concavely-curved outlet baffles that extend horizontally from the outlet-side of the vane pack and are affixed to the wall of the vertical vessel and a plurality of tubes connecting corresponding holes in each of the outlet baffles. The tubes extend vertically through the entirety of the outlet chord area and provide a second inlet chord area. Gas flows from the inlet to the inlet-side of the vane pack through the first and second inlet chord areas.

These advantages and others are provided by a separator device for separating solids or liquids from gas that includes a vertical vessel, including a wall that defines an interior of the vessel. The vessel includes an inlet, an outlet, and a vane pack connected to the outlet and defining an outlet chord area between an outlet-side of the vane pack and the outlet in the interior of the vessel. A first inlet chord area is defined from the inlet to an inlet-side of the vane pack by the wall of the vessel. The vane pack includes top and bottom convexly-curved outlet baffles that extend horizontally from the outlet-side of the vane pack, top and bottom convexly-curved outlet baffles that extend horizontally from the outlet-side of the vane pack, curved plates affixed to the convexly-curved outlet baffles, the curved plates and the convexly-curved outlet baffles defining vertical pockets that extend vertically through the entirety of the outlet chord area and provide a second inlet chord area, and a plurality of tubes connecting corresponding holes in each of the outlet baffles and extending vertically through the entirety of the outlet chord area. The plurality of tubes provide a third inlet chord area and gas flows from the inlet to the inlet-side of the vane pack through the first, second and third inlet chord areas.

These advantages and others are also provided by an enhanced vane bundle for use in separator vessels includes top and bottom convexly-curved outlet baffles that extend horizontally from the outlet-side of the vane pack, the outlet baffles including a plurality of corresponding holes. The enhanced vane bundle further includes curved plates affixed to the convexly-curved outlet baffles, the curved plates and the convexly-curved outlet baffles define vertical pockets that extend vertically through an entirety of an outlet chord area on an outlet side of the enhanced vane bundle. The enhanced vane bundle further includes a plurality of tubes connecting the corresponding holes of the outlet baffles and extending vertically through the entirety of the outlet chord area

DESCRIPTION OF THE DRAWINGS

In the detailed description which follows, reference will be made to the following Figures in which like numerals refer to like items, and in which.

DETAILED DESCRIPTION

Described herein are embodiments of an enhanced vane bundle design. Embodiments increase the inlet chord area available for incoming gas in impingement separators. Consequently, embodiments reduce the effect of chord area as a limiting factor for the gas capacity of vertical vessels employing impingement vanes.

In embodiments, to increase available inlet chord area, space in the outlet chord area is utilized as additional inlet chord area. Embodiments accomplish this by creating a secondary path for gas to flow to the inlet face of the vane pack. In embodiments, this second path is created by removing portions of outlet chord area (i.e., removing portions of the outlet baffles) and welding or otherwise affixing two curved plates (e.g., steel plates) to the vane boxing at the extreme sides of the vane pack and to the vessel inside wall near the outlet nozzle opening. The result is the creation of two parabolic pockets, each of which is open at the top and bottom, in the outlet chord area. In embodiments, these pockets run the full vertical length of the vane boxing. The curved plates isolate the incoming gas from the gas that has already passed through the vane pack and is moving towards the outlet nozzle.

This design necessitates that the gas flowing through the pockets must wrap itself around the top (or bottom) of the vane pack in order to reach the inlet side of the of the vane pack. Experiments show that this change of direction and subsequent mixing with the primary gas stream reduces turbulence at the vane face and aids in distributing the inlet gas more evenly across the inlet face of the vane pack. The effect of this reduction of turbulence and even distribution is to allow a reduction in the magnitude of the mal-distribution factor and, therefore, an increase the amount of gas that may be allowed to pass through a given vane bundle.

Because the chord area on both sides of the vane pack is now utilized as inlet chord area, the vane pack may now be returned to the vessel centerline (the widest point in the vessel) and additional vanes may be added to the vane pack, increasing overall area available to flow.

An alternative method of utilizing the principle described above is that, rather than creating side pockets for the inlet gas to pass through, the full outlet chord area may be filled with vertical tubes or pipes. In an embodiment, such tubes are welded or otherwise affixed to a tube sheet top and bottom and the tube sheets are welded or otherwise affixed to the vessel wall. So affixed, the tubes and tube sheets seal the incoming gas from the outlet gas. Such an arrangement may further increase the available inlet chord area. This alternative may ease the difficulty of installing the vane bundle in the shell but may require additional welding time. In embodiments, the tubes may be combined with the pockets to still further increase the inlet chord area available.

Figure 2A:
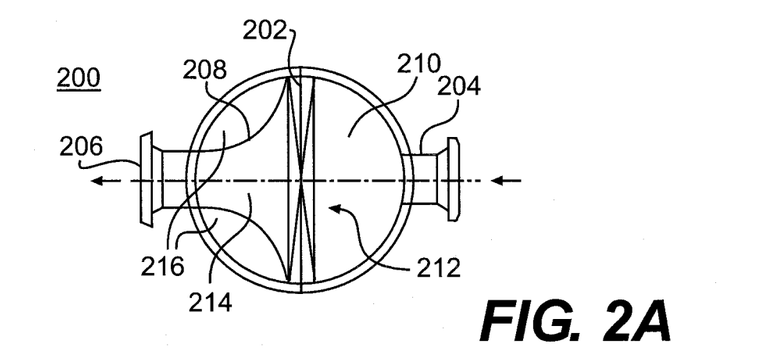
FIGS. 2A and 2B are top and side cross-sectional views illustrating a separator vessel containing an embodiment of an enhanced vane bundle design providing pockets.
Figure 2B:
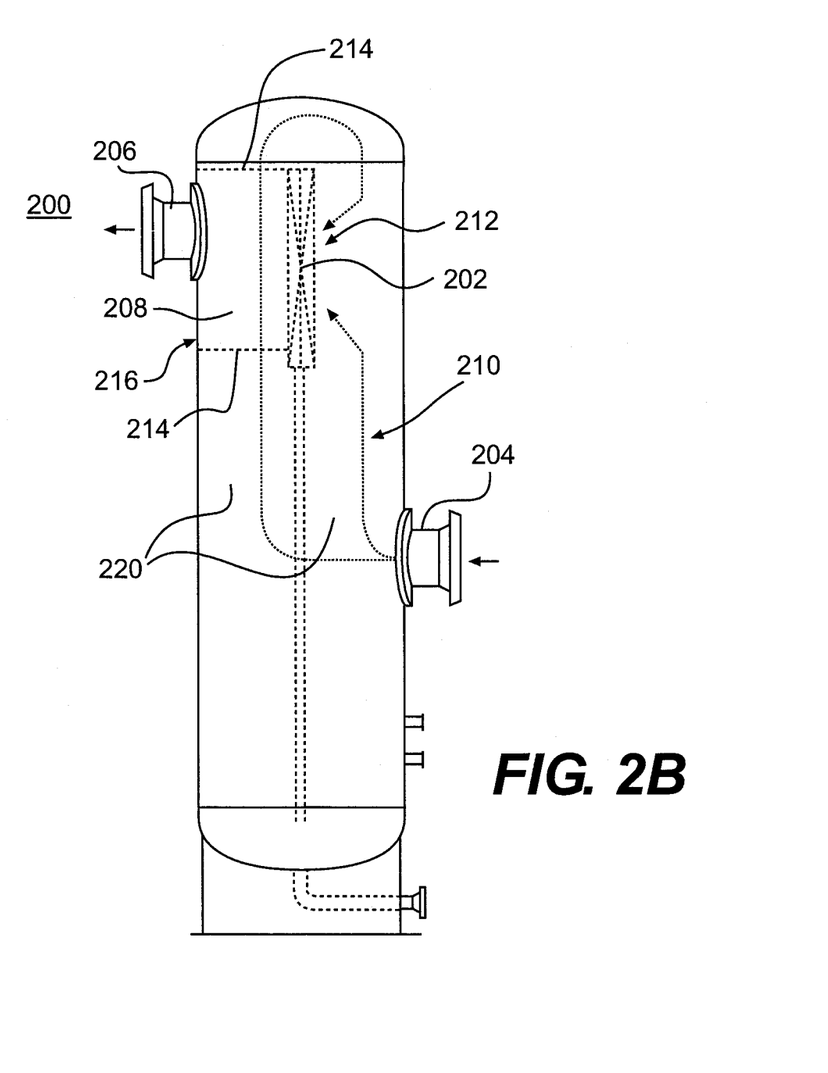

With reference now to FIGS. 2A and 2B, shown are top and side cross-sectional views of a separator vessel 200 with an embodiment of the enhanced vane bundle 202 with pockets. Enhanced vane bundle 202 is located in vertical separator vessel 200, which includes inlet 204, outlet 206 and enhanced vane bundle 202. Inlet 204 may include an inlet baffle (not shown). Ordinary inlet chord area 210 extends from inlet 204 to face or inlet-side 212 of enhanced vane bundle 202 inside separator vessel 200. Enhanced vane bundle 202 includes curved, vertical plates 208 that may be welded or otherwise affixed to outlet baffles 214 so together the plates 208 and baffles 214 provide pockets 216 that extend vertically through full height of enhanced vane bundle 202. Outlet baffles 214 may be formed in the shape shown in FIG. 2A, with convexly-curved sides that fit the vertical plates 208. Pockets 216 define additional inlet chord area on the backside or outlet-side of enhanced vane bundle 202. As shown, gas flow paths 220 pass through ordinary inlet chord area 210 and the additional inlet chord area provided by the pockets 216 to inlet-side 212 of enhanced vane bundle 202. Gas flow paths 220 through additional inlet chord area may wrap over top of enhanced vane bundle 202 as shown.

As noted, pockets 216 may be formed by placing curved plates 208 in outlet chord area as described above. The proportional size of the pockets 216, as compared to the enhanced vane bundle 202, may be as shown in FIGS. 2A and 2B. The pockets 216 may be parabolic shaped as shown. The parabolic shaped pockets 216 may provide the best balance of increased gas flow and inlet chord area without substantially affecting the impingement function of the enhanced vane bundle 202. Alternatively, different shaped and different proportionally-sized pockets 216 may be used. The actual size of the pockets 216 and the overall enhanced vane bundle 202 will be affected by the size and application of the vessel 200.

Figure 3:
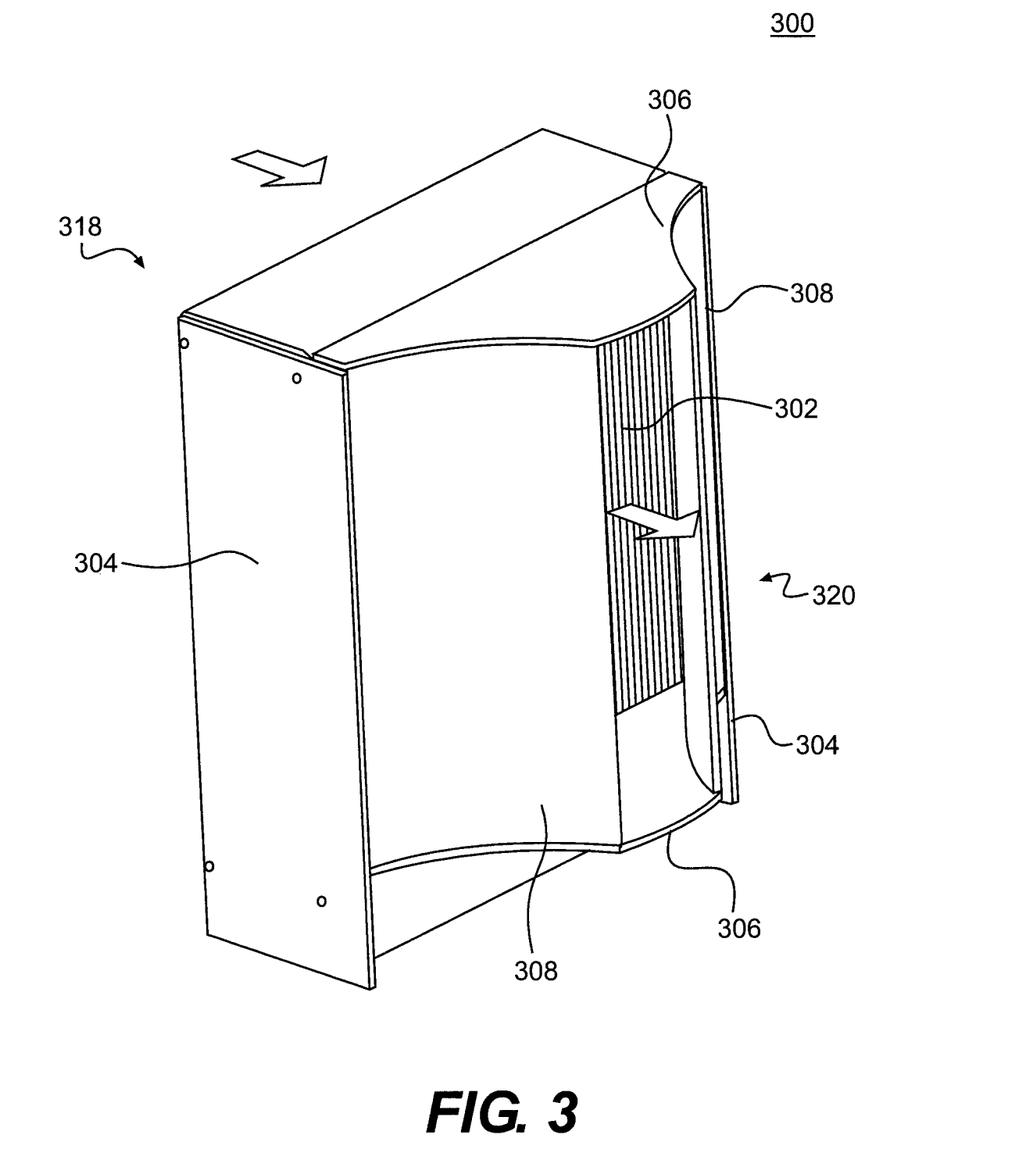
FIG. 3 is a perspective side view of an embodiment of an enhanced vane bundle design providing pockets.

With reference now to FIG. 3, shown is an embodiment of enhanced vane bundle 300 that provides additional inlet chord area. Enhanced vane bundle 300 is similar to enhanced vane bundle 202 shown in FIGS. 2A-2B. Enhanced vane bundle 300 includes vanes 302, boxing 304, convexly-curved outlet baffles 306, and convexly-curved vertical plates 308. Accordingly, enhanced vane bundle 300 defines pockets between separator vessel wall and vertical plates 308 on outlet-side 320 of enhanced vane bundle 300 and these pockets provide additional inlet chord area for gas to flow vertical past outlet-side 320 of enhanced vane bundle to inlet-side 318 of enhanced vane bundle 300. Plates 308 may be welded or otherwise affixed to outlet baffles 306 and boxing 304.

Figure 4:
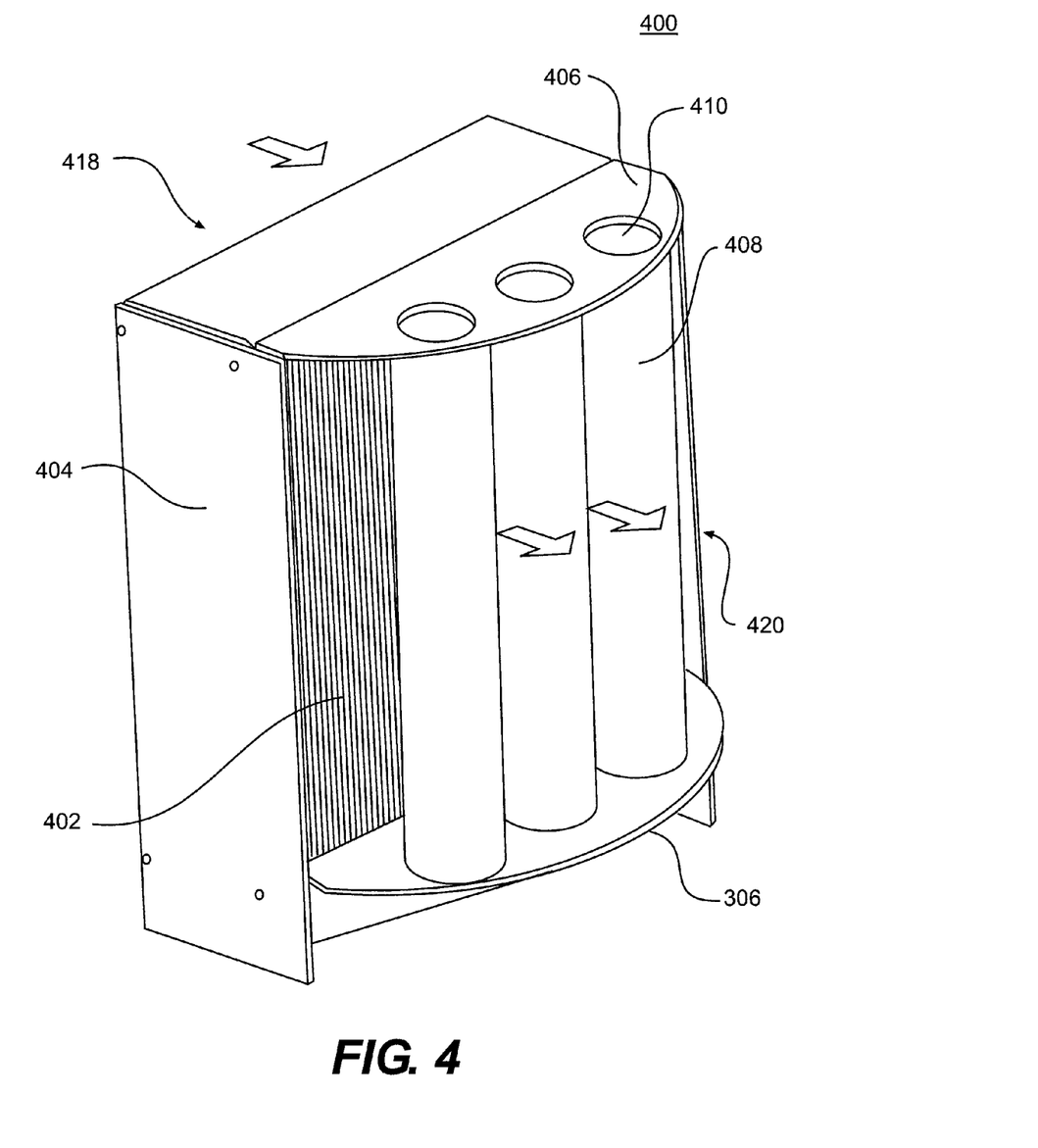
FIG. 4 is a perspective side view of an embodiment of an enhanced vane bundle design with tubes

With reference now to FIG. 4, shown is an embodiment of enhanced vane bundle 400 that provides additional inlet chord area. Enhanced vane bundle 400 provides additional inlet chord area by providing tubes/pipes that extend vertically through outlet chord area formed by outlet baffles and interior walls of separator vessel (not shown). Enhanced vane bundle 400 includes vanes 402, boxing 404, and concavely-curved outlet baffles 406. As noted with reference to FIG. 1, outlet baffles 406 are concavely-curved to fit curved, interior walls of separator vessel, preventing the vertical flow of outlet gas and channeling outlet gas through outlet (not shown) of separator vessel. Each outlet baffle 406 include corresponding holes 410 that are connected by tubes/pipes 408 that extend vertically through full height of outlet chord area (formed between outlet baffles 406). Tubes 408 provide additional inlet chord area, through the tubes 408 themselves, extending vertically through the outlet chord area. Consequently, inlet gas flow paths pass through tubes 408 on outlet-side 420 of enhanced vane bundle 400 to inlet-side 418 of enhanced vane bundle 400, wrapping over top of enhanced vane bundle 400. In this manner, as with above embodiment, additional inlet gas flow is provided through enhanced vane bundle 400.

Additional inlet chord area may be formed by welding or otherwise affixing tubes 408 to the outlet baffles 406 (upper and lower). Tubes 408 may be round. Alternatively, different shaped and different proportionally-sized tubes 408 may be used. The actual size of the tubes 408 and the overall enhanced vane bundle 400 may be determined in relation to the size and application of the separator vessel in which enhanced vane bundle 400 is used.

Figure 5:
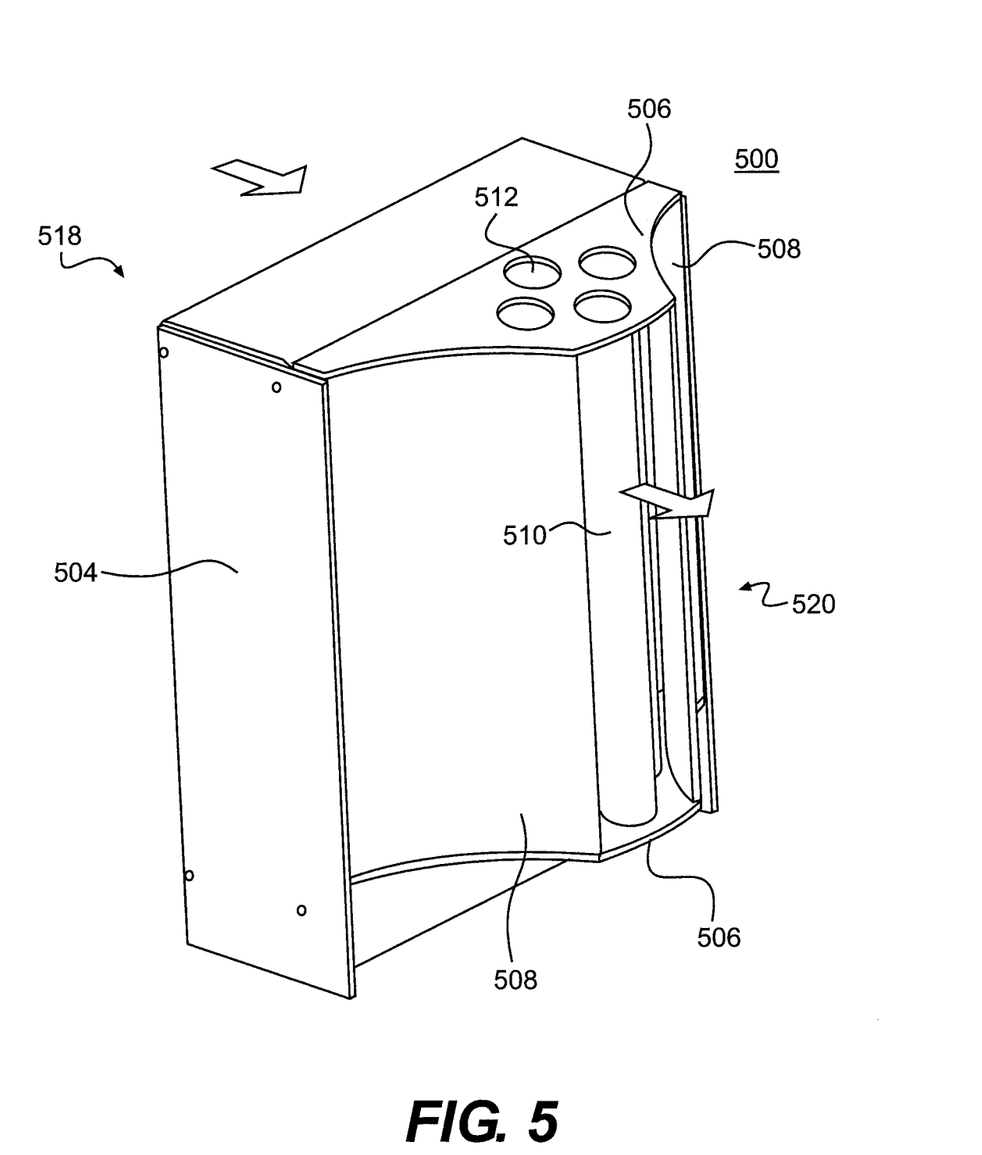
FIG. 5 is a perspective side view of an embodiment of an enhanced vane bundle design with tubes and pockets.

With reference now to FIG. 5, shown is an embodiment of enhanced vane bundle 500 that provides additional inlet chord area. Enhanced vane bundle 500 provides additional inlet chord area by providing pockets and tubes/pipes that extend vertically through outlet chord area. Enhanced vane bundle 500 includes vanes (not shown), boxing 504, convexly-curved outlet baffles 506 and curved, vertical plates 508. As noted with reference to FIGS. 2-3, outlet baffles 506 are convexly-curved to fit curved, vertical plates 508, and together with curved, vertical plates 508, to define pockets between enhanced vane bundle 500 and interior walls of separator vessel. The pockets provide additional inlet chord area through full height of outlet chord area. Each outlet baffle 506 also include corresponding holes 512 that are connected by tubes/pipes 510 that extend vertically through full height of outlet chord area. Tubes 508 provide additional inlet chord area, through the tubes 508 themselves, extending vertically through the outlet chord area. Consequently, inlet gas flow paths pass through pockets and through tubes 508 on outlet-side 520 of enhanced vane bundle 500 to inlet-side 518 of enhanced vane bundle 500, wrapping over top of enhanced vane bundle 500. In this manner, as with above embodiment, additional inlet gas flow is provided through enhanced vane bundle 500.

Additional inlet chord area may be formed by welding or otherwise affixing tubes 408 to the outlet baffles 406 (upper and lower). Tubes 408 may be round. Alternatively, different shaped and different proportionally-sized tubes 408 may be used. The actual size of the tubes 408 and the overall enhanced vane bundle 400 may be determined in relation to the size and application of the separator vessel in which enhanced vane bundle 400 is used.

Figure 6A:
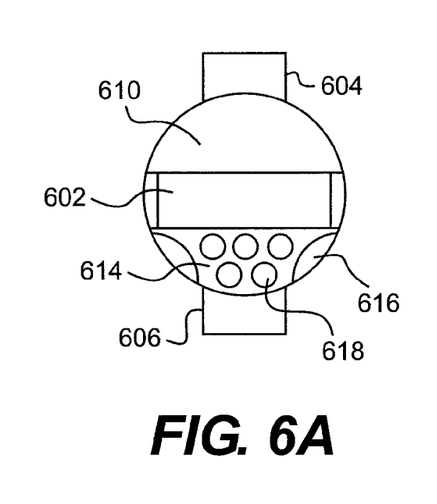
FIGS. 6A and 6B are top and side cross-sectional views illustrating an embodiment of an enhanced vane bundle design with pockets and tubes.
Figure 6B:
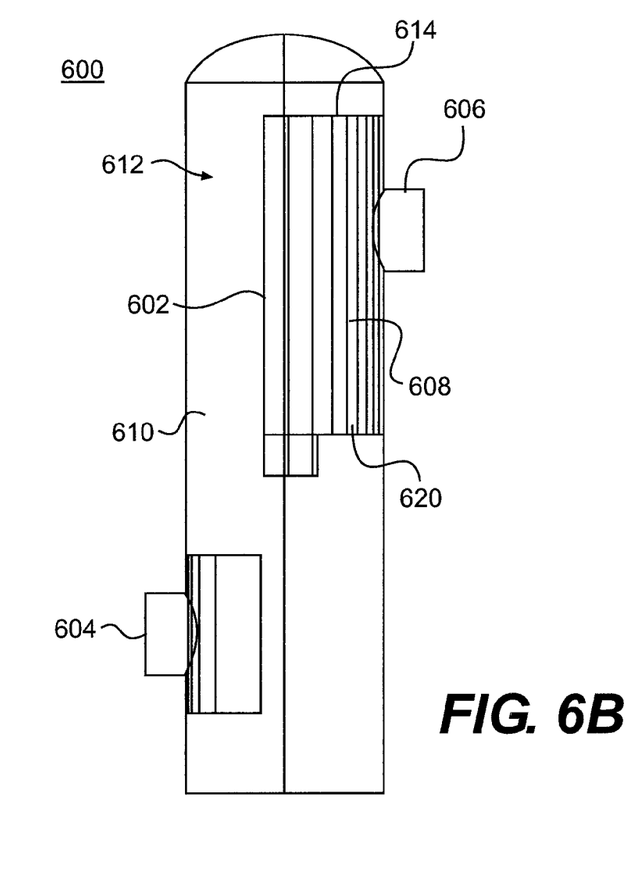

With reference now to FIGS. 6A and 6B, shown are top and side cross-sectional views of a vertical separator vessel 600 with an embodiment of the enhanced vane bundle 602. Enhanced vane bundle 602 includes pockets and tubes, similarly to embodiment of enhanced vane bundle 500 shown in FIG. 5. Vertical separator vessel 600 includes inlet 604, outlet 606 and enhanced vane bundle 602. Ordinary inlet chord area 610 extends from inlet 604 to face or inlet-side 612 of enhance vane bundle 602 inside separator vessel 600. Enhanced vane bundle 602 includes curved, vertical plates 608 that may be welded or otherwise affixed to convexly-curved outlet baffles 614 so together the plates 608 and baffles 614 provide pockets 616 that extend vertically through full height of enhanced vane bundle 602. Pockets 616 define additional inlet chord area on the backside or outlet-side of enhanced vane bundle 602. Vertical tubes (not shown) are also provided connecting holes 618 formed in each outlet baffle 614. In the embodiment shown, there are five tubes connecting five holes 618 and providing additional inlet chord area through tubes themselves and through height of outlet chord area.

As apparent from above, inlet gas passes through ordinary inlet chord area 610 and the additional inlet chord area provided by the pockets 616 and tubes to inlet-side 612 of enhanced vane bundle 602. Gas flow paths through additional inlet chord area may wrap over top of enhanced vane bundle 602. Outlet chord area includes pockets 616 and tubes/pipes that extend vertically through full height of outlet chord area. Pockets 616 and tubes provide additional inlet chord area by extending vertically through the baffles 614.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. An enhanced vane bundle for use in separator vessels, the enhanced vane bundle including:
    top and bottom convexly-curved outlet baffles that extend horizontally from the outlet-side of the enhanced vane bundle; and curved plates affixed to the convexly-curved outlet baffles, wherein the curved plates and the convexly-curved outlet baffles define vertical pockets that extend vertically through an entirety of an outlet chord area on an outlet-side of the enhanced vane bundle.

2. The enhanced vane bundle of claim 1 further including a boxing, wherein the outlet baffles are affixed to the boxing.

3. The enhanced vane bundle of claim 1 further including a boxing, wherein the curved plates are affixed to the boxing.

4. The enhanced vane bundle of claim 1, wherein the curved plates are convex.

5. The enhanced vane bundle of claim 1, wherein the curved plates are spaced from each other to provide an outlet gas flow path within the outlet chord area.

6. An enhanced vane bundle for use in separator vessels, the enhanced vane bundle including:
   top and bottom convexly-curved outlet baffles that extend horizontally from the outlet-side of the enhanced vane bundle, wherein the outlet baffles include a plurality of corresponding holes;
   curved plates affixed to the convexly-curved outlet baffles, wherein the curved plates and the convexly-curved outlet baffles define vertical pockets that extend vertically through an entirety of an outlet chord area on an outlet-side of the enhanced vane bundle; and
   a plurality of tubes connecting the corresponding holes of the outlet baffles and extending vertically through the entirety of the outlet chord area.

7. The enhanced vane bundle of claim 6 further including a boxing, wherein the outlet baffles are affixed to the boxing.

8. The enhanced vane bundle of claim 6 further including a boxing, wherein the curved plates are affixed to the boxing.

9. The enhanced vane bundle of claim 6, wherein the curved plates are convex.

10. The enhanced vane bundle of claim 6, wherein the curved plates are spaced from each other to provide an outlet gas flow path within the outlet chord area.

11. The enhanced vane bundle of claim 6, wherein the plurality of tubes are positioned between the curved plates within the outlet chord area.

12. The enhanced vane bundle of claim 6, wherein the plurality of tubes consists of four tubes.

* * * * *

UNITED STATES PATENT AND TRADEMARK OFFICE
CERTIFICATE OF CORRECTION

PATENT NO. : 8,673,039 B2  
APPLICATION NO. : 13/952358  
DATED : March 18, 2014  
INVENTOR(S) : William S. Asbury Page 1 of 1

It is certified that error appears in the above-identified patent and that said Letters Patent is hereby corrected as shown below:

On the Title Page, Item (73) Assignee: delete "Mfg," and insert therefor --Mfg.--.

Signed and Sealed this  
Twenty-second Day of July, 2014

Michelle K. Lee  
*Deputy Director of the United States Patent and Trademark Office*